US012070790B2

(12) United States Patent
Itoi et al.

(10) Patent No.: US 12,070,790 B2
(45) Date of Patent: Aug. 27, 2024

(54) MOLD AND METHOD OF MANUFACTURING THE SAME

(71) Applicant: G-TEKT CORPORATION, Saitama (JP)

(72) Inventors: Hiroki Itoi, Tokyo (JP); Takashi Nagatomo, Gunman (JP); Makoto Tanaka, Gunma (JP)

(73) Assignee: G-TEKT CORPORATION, Saitama (JP)

( * ) Notice: Subject to any disclaimer, the term of this patent is extended or adjusted under 35 U.S.C. 154(b) by 301 days.

(21) Appl. No.: 17/631,285

(22) PCT Filed: Aug. 3, 2020

(86) PCT No.: PCT/JP2020/029655
§ 371 (c)(1),
(2) Date: Jan. 28, 2022

(87) PCT Pub. No.: WO2021/020589
PCT Pub. Date: Feb. 4, 2021

(65) Prior Publication Data
US 2022/0250134 A1 Aug. 11, 2022

(30) Foreign Application Priority Data

Aug. 1, 2019 (JP) .................. 2019-141974

(51) Int. Cl.
*B21D 37/16* (2006.01)
*B21D 22/02* (2006.01)
*B21D 37/14* (2006.01)
(52) U.S. Cl.
CPC ........... *B21D 37/16* (2013.01); *B21D 22/022* (2013.01); *B21D 37/14* (2013.01)

(58) Field of Classification Search
CPC ...... B21D 37/16; B21D 37/14; B21D 22/208; B21D 22/10; B21D 22/02; B21D 22/022
See application file for complete search history.

(56) References Cited

U.S. PATENT DOCUMENTS

2008/0079201 A1   4/2008  Durney
2008/0295563 A1*  12/2008  Terziakin ............... B21D 22/02
                                                          72/364

(Continued)

FOREIGN PATENT DOCUMENTS

CN   103084474 A   5/2013
CN   208527847 U   2/2019

(Continued)

OTHER PUBLICATIONS

International Preliminary Report on Patentability received for PCT Patent Application No. PCT/JP2020/029655, mailed on Feb. 10, 2022, 15 pages (8 pages of English Translation and 7 pages of Original Document).

(Continued)

*Primary Examiner* — Teresa M Ekiert
(74) *Attorney, Agent, or Firm* — WOMBLE BOND DICKINSON (US) LLP

(57) ABSTRACT

A mold includes a mold main body (12) including a molding face (12a) and a support base (11) including a mounting surface (15) which tightly contacts a back face (12a) of the mold main body (12), the support base (11) being mounted with the mold main body (12). The mold includes a refrigerant passage (43) through which a refrigerant for cooling the mold main body (12) and the support base (11) flows. The refrigerant passage (43) includes a groove (16) which is open to at least one surface of the mounting surface (15) of the support base (11) and the back face (12b) of the mold main body (12) and extends along the one surface. There can (Continued)

be provided a mold that can uniformly cool the molded product.

9 Claims, 17 Drawing Sheets

(56) References Cited

U.S. PATENT DOCUMENTS

| | | | |
|---|---|---|---|
| 2009/0293571 A1 | 12/2009 | Vehof et al. | |
| 2013/0111965 A1 | 5/2013 | Lee | |
| 2013/0305802 A1* | 11/2013 | Lee | B21D 22/022 |
| | | | 72/342.1 |
| 2016/0339546 A1 | 11/2016 | Sung et al. | |
| 2017/0056951 A1* | 3/2017 | Harrison | B21D 22/208 |
| 2018/0021833 A1 | 1/2018 | Suzuki et al. | |
| 2018/0272406 A1* | 9/2018 | Saini | B21D 37/16 |

FOREIGN PATENT DOCUMENTS

| | | |
|---|---|---|
| DE | 102012211241 A1 | 5/2013 |
| JP | 57-086028 U | 5/1982 |
| JP | 06-007865 A | 1/1994 |
| JP | 2003-231915 A | 8/2003 |
| JP | 2010-502449 A | 1/2010 |
| JP | 2011-161449 A | 8/2011 |
| JP | 2012-196690 A | 10/2012 |
| JP | 2013-099774 A | 5/2013 |
| JP | 2018-012113 A | 1/2018 |
| JP | 2018-083223 A | 5/2018 |
| KR | 10-2013-0050025 A | 5/2013 |
| KR | 10-1365195 B1 | 2/2014 |
| KR | 10-2016-0074247 A | 6/2016 |
| WO | 2012/160703 A1 | 11/2012 |

OTHER PUBLICATIONS

International Search Report and Written Opinion received for PCT Patent Application No. PCT/JP2020/029655, mailed on Oct. 6, 2020, 17 pages (8 pages of English Translation and 9 pages of Original Document).
Office Action received for Japanese Patent Application No. 2019-141974, mailed on Apr. 27, 2021, 8 pages (5 pages of English Translation and 3 pages of Office Action).
Office Action received for Japanese Patent Application No. 2019-141974, mailed on Aug. 11, 2020, 19 pages (11 pages of English Translation and 8 pages of Office Action).
Office Action received for Japanese Patent Application No. 2019-141974, mailed on Dec. 8, 2020, 15 pages ( 9 pages of English Translation and 6 pages of Office Action).
Notice of Reasons for Refusal received for Japanese Patent Application No. 2022-004134, mailed on Nov. 15, 2022, 10 pages (7 pages of English Translation and 3 pages of Office Action).

* cited by examiner

MOLD AND METHOD OF MANUFACTURING THE SAME

TECHNICAL FIELD

The present invention relates to a mold including an internal refrigerant passage and a method of manufacturing the mold.

BACKGROUND ART

As a technique of molding a skeleton component of a vehicle, a hot stamping method is known as one of the hot press methods. This hot stamping method is a method of loading a metal plate member heated to a high temperature into a hot press molding apparatus and performing the press molding and hardening of this metal plate member. A conventional hot press molding apparatus which can be used to perform this kind of hot stamping method is described in, for example, patent literature 1.

The conventional hot press molding apparatus disclosed in patent literature 1 employs an arrangement of flowing a refrigerant in a refrigerant passage formed in a mold to maintain the temperature of the mold at a low temperature. The refrigerant passage is formed by using a hole formed in the mold by machining.

RELATED ART LITERATURE

Patent Literature

Patent Literature 1: Japanese Patent Laid-Open No. 2018-12113

DISCLOSURE OF INVENTION

Problem to be Solved by the Invention

The hole formed in the mold by machining is formed to linearly extend. For this reason, if the shape of a work has a height difference or a curved surface is included in a work to complicate a molding face, it is difficult to keep an interval between the refrigerant passage and the molding face constant. In this case, a portion with a relatively high temperature and a portion with a relatively low temperature are formed in the molding face. A molded product may not be rapidly cooled uniformly at the time of molding (the high-temperature portion is left in the molded product). One molding operation is performed until the temperature of the molded product reaches a predetermined low temperature. Accordingly, if the high-temperature portion is left in the molded product at the time of molding, the operation cannot be shifted to the next step until this high-temperature portion is cooled. For this reason, the production efficiency lowers. This problem occurs in all molds if such a mold has the refrigerant passage.

The present invention has an object to provide a mold that allows uniform cooling of a molded product and a method of manufacturing the mold.

Means of Solution to the Problem

In order to achieve the above object, a mold according to the present invention is a mold comprising a mold main body including a molding face, a support base including a mounting surface which contacts a back face of the mold main body, the back face located on an opposite side to the molding face, the support base being mounted with the mold main body, and a refrigerant passage through which a refrigerant for cooling the mold main body and the support base flows, wherein the refrigerant passage includes a groove open to at least one surface of the mounting surface of the support base and the back face of the mold main body and extending along the one surface.

A mold according to the present invention comprises a mold member, a molding face formed on a surface of the mold member, and a refrigerant passage formed inside the mold member such that the refrigerant passage extends along the molding face apart from the molding surface at a predetermined distance, wherein the mold member is formed such that a region including an entire range of the refrigerant passage from the molding face is made of a single material.

A method of manufacturing a mold according to the present invention comprises a mold main body forming step of forming a metal main body including a molding face, a support base forming step of forming a support base including a mounting surface which contacts a back face of the mold main body, the back face located on an opposite side to the molding face, a groove forming step of forming a groove open to at least one surface of the mounting surface of the support base and the back face of the mold main body and extending along the one surface, and a mounting step of mounting the mold main body on the support base such that the back face of the mold main body overlaps the mounting surface of the support base.

Effect of the Invention

According to the present invention, there can be provided a mold that allows substantially uniform cooling of a molded product and a method of manufacturing the mold.

BEST MODE FOR CARRYING OUT THE INVENTION

First Embodiment

A mold and a method of manufacturing the same according to an embodiment of the present invention will be described in detail with reference to FIGS. 1 to 10. In this embodiment, an example in which the present invention is applied to a hot press mold will be described below.

Figure 1:
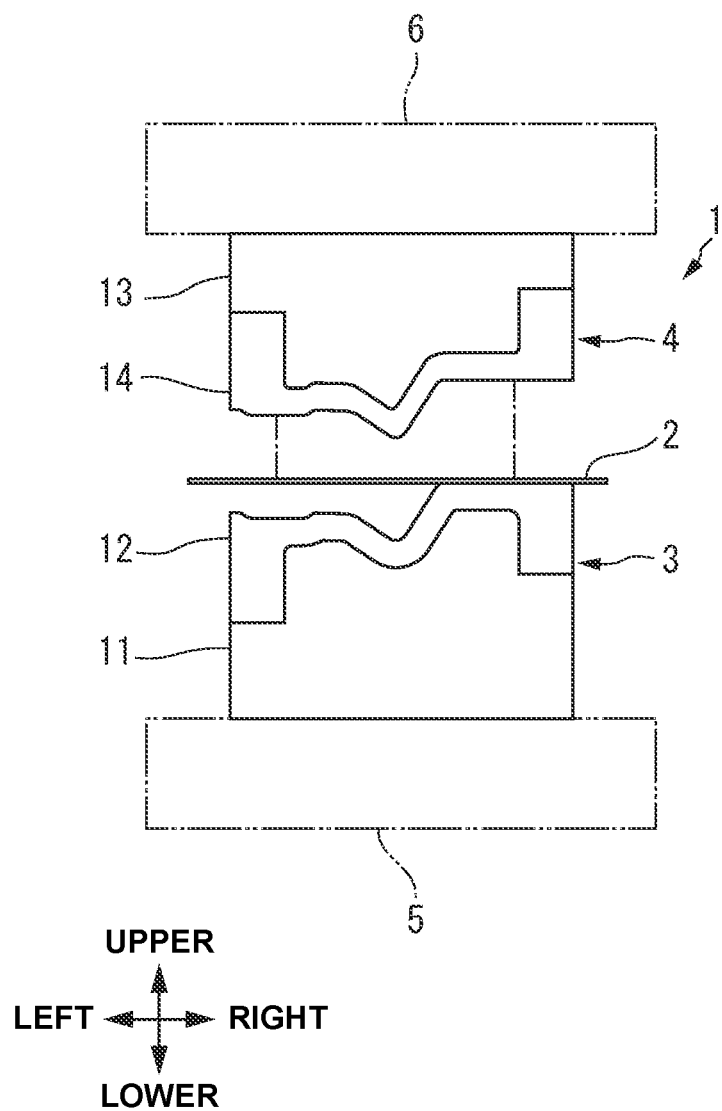
FIG. 1 is a front view showing an arrangement of a mold according to the present invention.

A hot press mold 1 shown in FIG. 1 is to mold a heated metal plate member 2 into a predetermined shape by a hot stamping method as one of the press molding methods. The hot press mold 1 according to this embodiment is formed by a lower mold 3 and an upper mold 4.

The lower mold 3 and the upper mold 4 are respectively supported by mold holders 5 and 6 of a molding apparatus (not shown). The molding apparatus is arranged such that the upper mold 4 can be brought into contact with or separated from the lower mold 3. In the following description, the directions for describing the arrangement of the hot press mold 1 will be described such that for the descriptive convenience the front side of the drawing surface of FIG. 1 is defined as a front side, and the back of the drawing surface of FIG. 1 is defined as a rear side. In addition, in the following description, the upper side when the hot press mold 1 shown in FIG. 1 is viewed from the front side is defined as the upper side of the hot press mold 1, and the right side is defined as the right side of the hot press mold 1.

The lower mold 3 includes a support base 11 mounted on the mold holder 5 and a mold main body 12 mounted on the support base 11. The upper mold 4 includes a support base 13 mounted on the mold holder 6 and a mold main body 14 mounted on the support base 13. The lower mold 3 and the upper mold 4 have different directions in which they contact the metal plate member 2 and different shapes in which they contact the metal plate member 2, but they are formed to have the same structure. For this reason, in the following description, only the arrangement of the lower mold 3 will be described, and the description of the upper mold 4 will be appropriately omitted.

Figure 2:
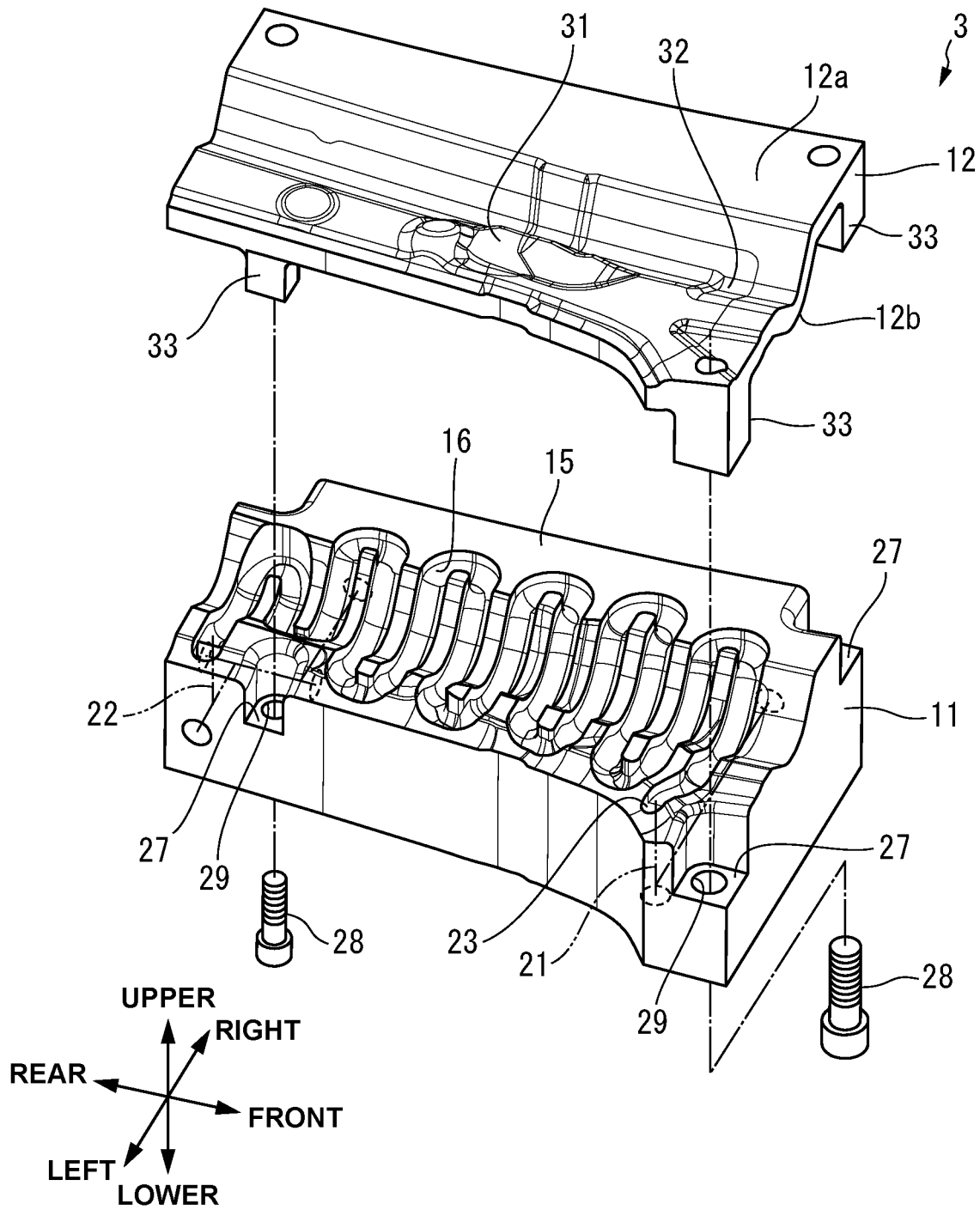
FIG. 2 is an exploded perspective view of a lower mold.
Figure 3:
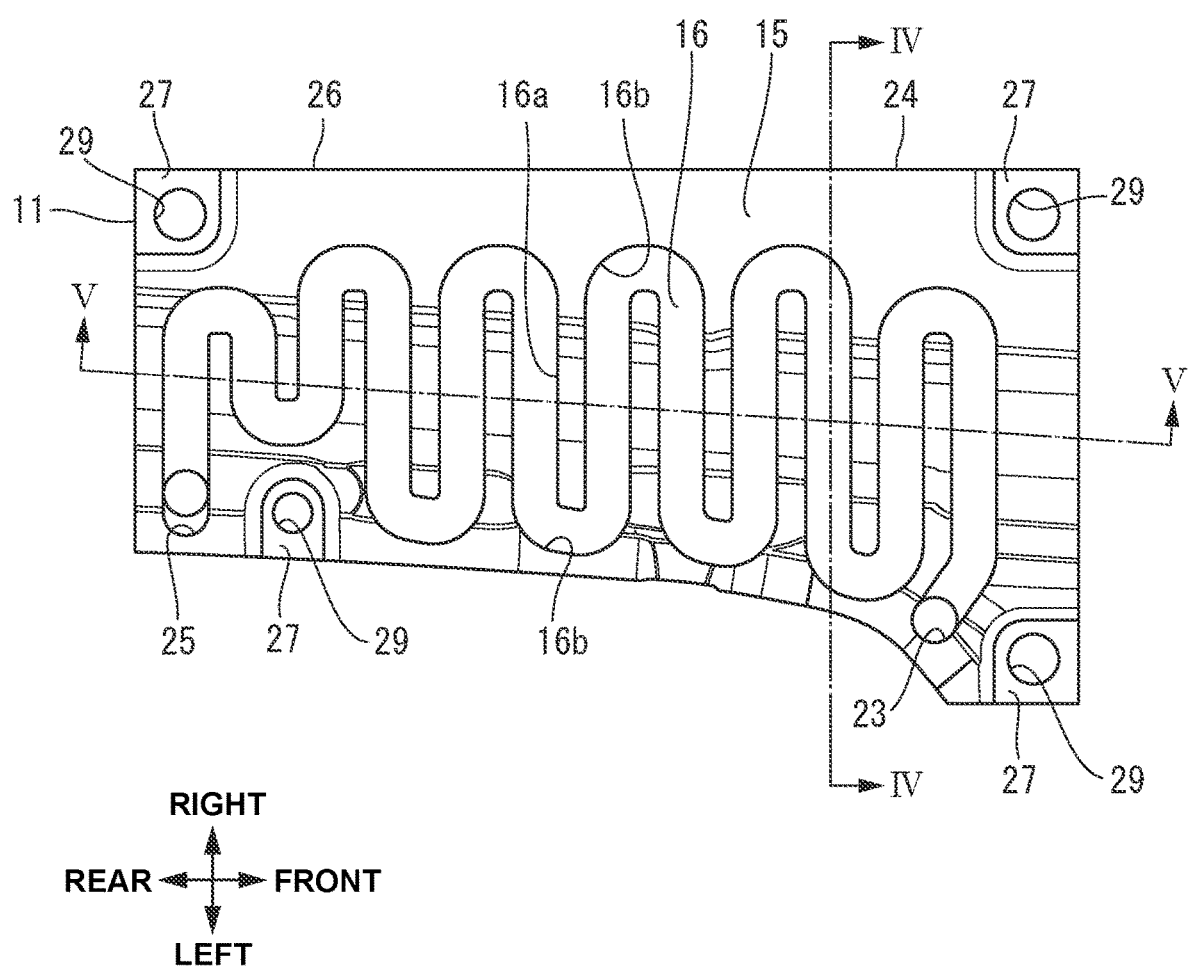
FIG. 3 is a plan view of the support base of the lower mold.

As shown in FIGS. 2 and 3, the support base 11 of the lower mold 3 has a rectangular shape longer in the front-and-rear direction when viewed from the above. A mounting surface 15 overlapping the mold main body 12 (to be described in detail later) is formed at the upper end of the support base 11. The mounting surface 15 is formed to have a shape that conforms to a back face 12b located on the opposite side to a molding face 12a of the mold main body 12. The mounting surface 15 is formed to contact the back face 12b of the mold main body 12 in the entire region of the formation range.

Figure 4:
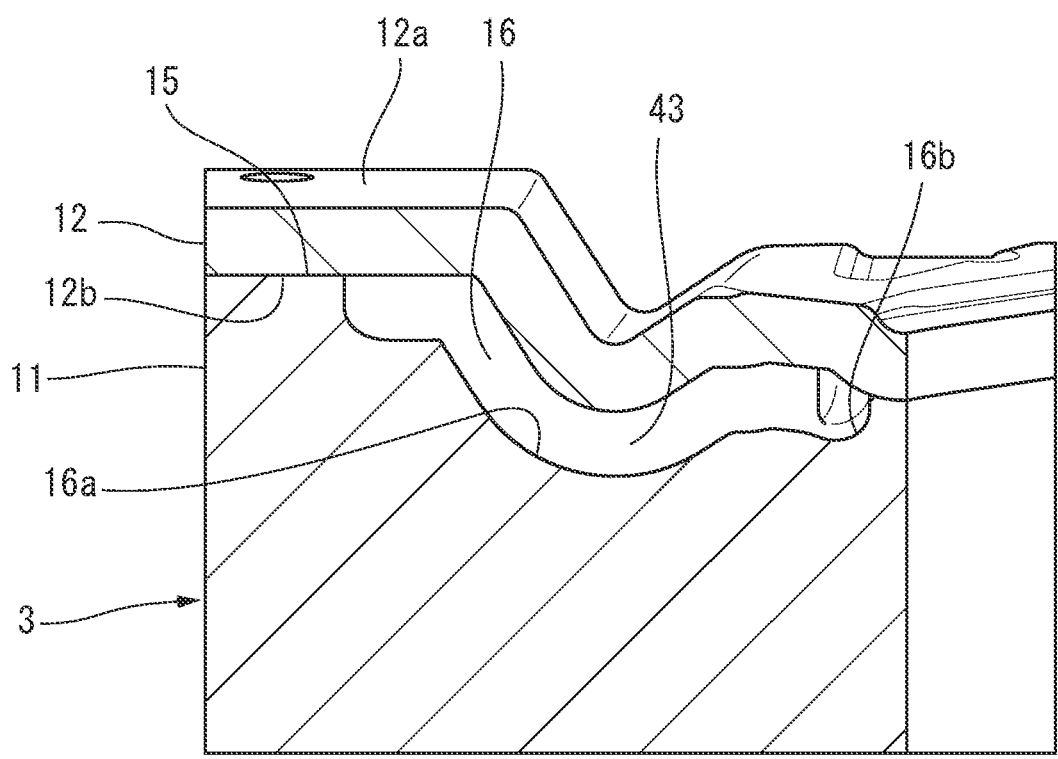
FIG. 4 is a sectional view when viewed from the front-and-rear direction of the lower mold.
Figure 5:
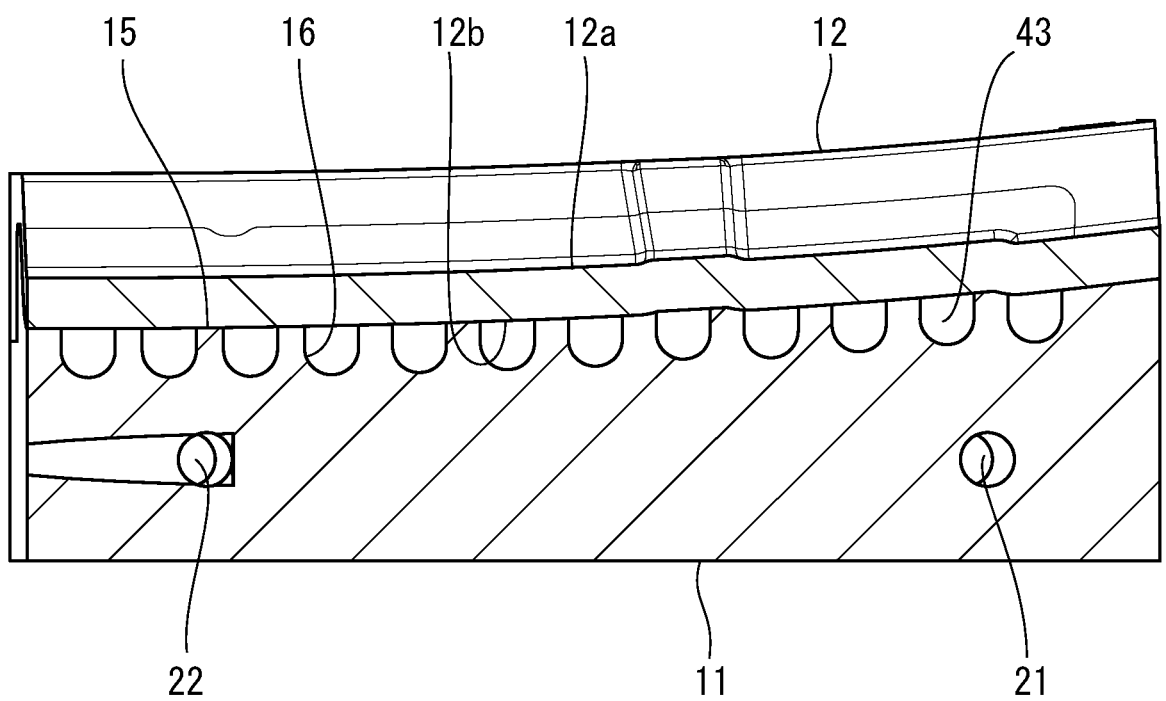
FIG. 5 is a sectional view when viewed from the right-and-left direction of the lower mold.

A groove 16 is formed in the mounting surface 15. The groove 16 is open to the mounting surface 15 and extends in the right-and-left direction and the front-and-rear direction along the mounting surface 15 so that the sectional area of the groove 16 is constant, as shown in FIGS. 4 and 5. As shown in FIG. 3, the groove 16 according to this embodiment includes a plurality of straight portions 16a linearly extending in the right-and-left direction when viewed from the above and a plurality of U-shaped portions 16b each connected to the two ends of the corresponding straight portion 16a and bent in a U shape. The groove 16 extends from the front left side to the rear left side of the support base 11. This groove 16 is formed by cutting the upper surface of the support base 11 by using a rotary tool (not shown).

One end of the groove 16 located on the front left side of the support base 11 is connected to a first passage hole 21 formed in the front end portion of the support base 11, as indicated by the long and two short dashed line in FIG. 2. The other end of the groove 16 located on the rear left side of the support base 11 is connected to a second passage hole 22 formed in the rear end portion of the support base 11. The first passage hole 21 and the second passage hole 22 are formed in the support base 11 by using, for example, a drill (not shown). The material for forming the support base 11 can be, for example, mechanical structure carbon steel so as to facilitate machining of the groove 16.

The first passage hole 21 is open to one end 23 located on the front left side of the groove 16 and a right side surface 24 (see FIG. 3) of the front end portion of the support base 11. The second passage hole 22 is open to the other end 25 located on the rear left side of the groove 16 and a right side surface 26 of the rear end portion of the support base 11. The first passage hole 21 and the second passage hole 22 are connected to a refrigerant supply device (not shown). The refrigerant supply device is arranged to supply a liquid refrigerant to the passage hole of any one of the first passage hole 21 and the second passage hole 22 and discharge the refrigerant from the other passage hole. Water, a cooling solution containing a drug, or the like can be used as the liquid refrigerant.

Mounting seats 27 are formed on the two end portions in the right-and-left direction of the front end portion of the support base 11 and the two end portions in the right-and-left direction of the rear end portion of the support base 11, respectively. These mounting seats 27 are used to fix the mold main body 12 on the support base 11 and are formed at positions lower than the mounting surface 15. Through holes 29 for receiving fixing bolts 28 (see FIG. 2) are formed in the mounting seats 27, respectively.

Figure 6:
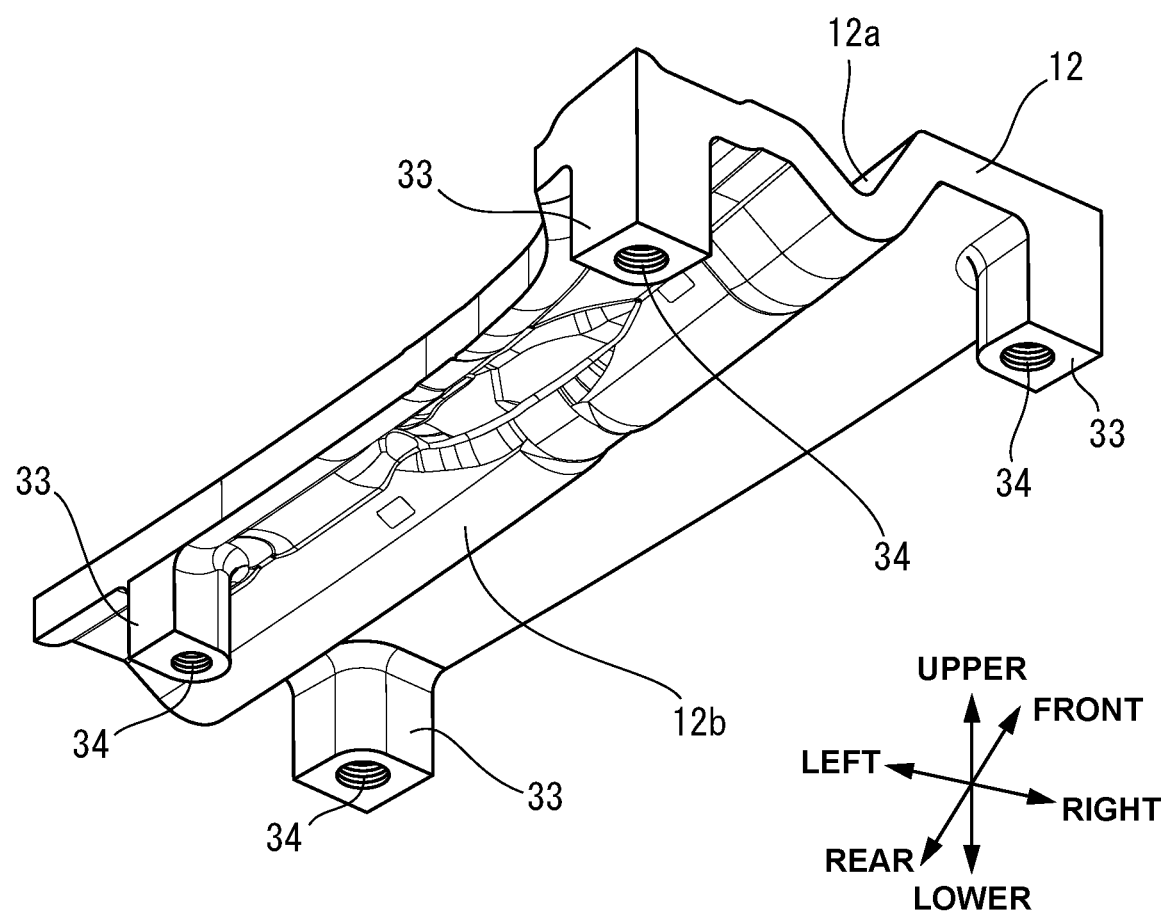
FIG. 6 is a perspective view when a mold main body is viewed from the support base side.

As shown in FIG. 2, the mold main body 12 is formed to have a plate shape such that the upper end of the mold main body 12 serves as the molding face 12a. For example, hot press mold steel can be used as the material for forming the mold main body 12. A projecting portion 31 and a recessed portion 32 are formed on and in the molding face 12a. The shape of the mold main body 12 when viewed from the above is the same shape as the planar shape of the support base 11. Columnar bodies 33 protruding downward are formed at the right and left end portions of the front side of the mold main body 12 and the right and left end portions of the rear side, as shown in FIG. 6. The columnar bodies 33 are formed to overlap the mounting seats 27 of the support base 11 from the above. In addition, screw holes 34 with which the fixing bolts 28 threadably engaged are formed in the columnar bodies 33, respectively.

The back face 12b, which is the back face of the mold main body 12, except the columnar bodies 33 is formed to follow the molding face 12a, as shown in FIGS. 4 and 5. For this reason, the mold main body 12 is formed such that the thickness of a portion except the columnar bodies 33 is kept substantially constant. The sectional position in FIG. 4 is a position along a line IV-IV in FIG. 3. The sectional position in FIG. 5 is a position along a line V-V in FIG. 3.

A method of manufacturing the hot press mold 1 arranged as described above will be described with reference to the flowchart shown in FIG. 7.

Figure 7:
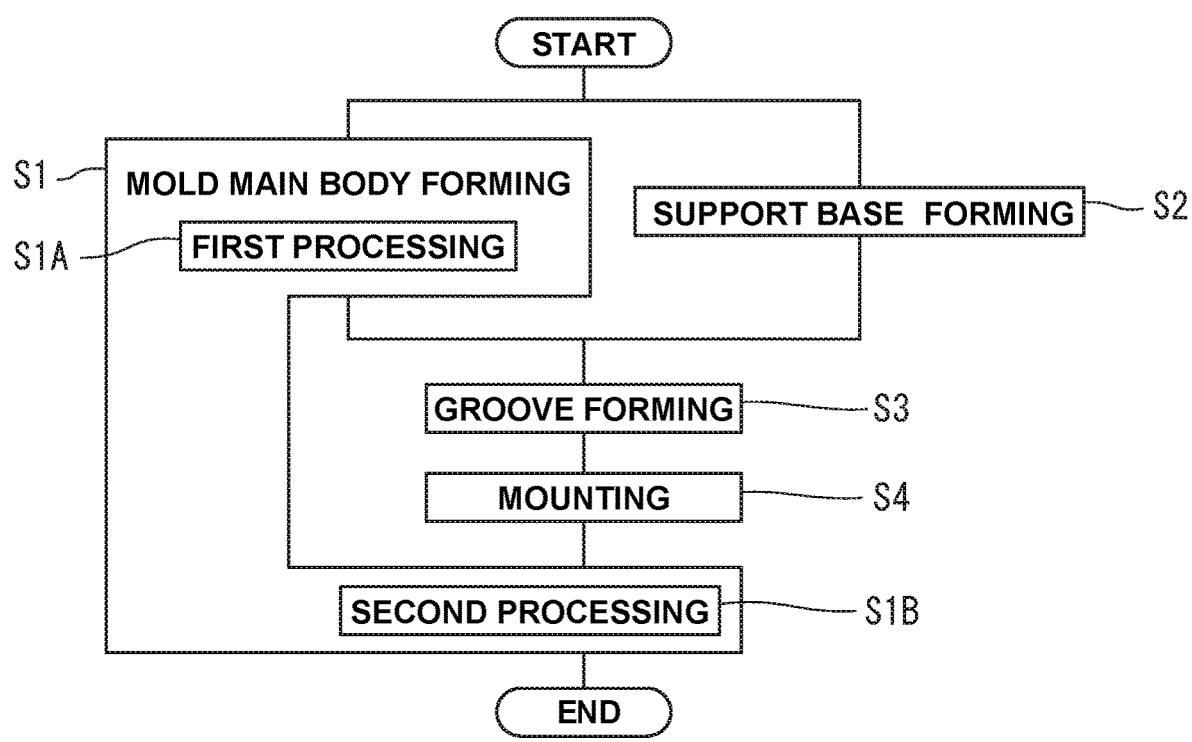
FIG. 7 is a flowchart for explaining a method of manufacturing a mold according to the present invention.

The manufacture of the hot press mold 1 is performed by mold main body forming step S1, support base forming step S2, groove forming step S3, and mounting step S4, as shown in FIG. 7. Mold main body forming step S1 will be described in detail later, but can be performed by dividing it into first processing step S1A for processing the back face 12b of the mold main body 12 and second processing step S1B of processing the molding face 12a of the mold main body 12.

Figure 8:
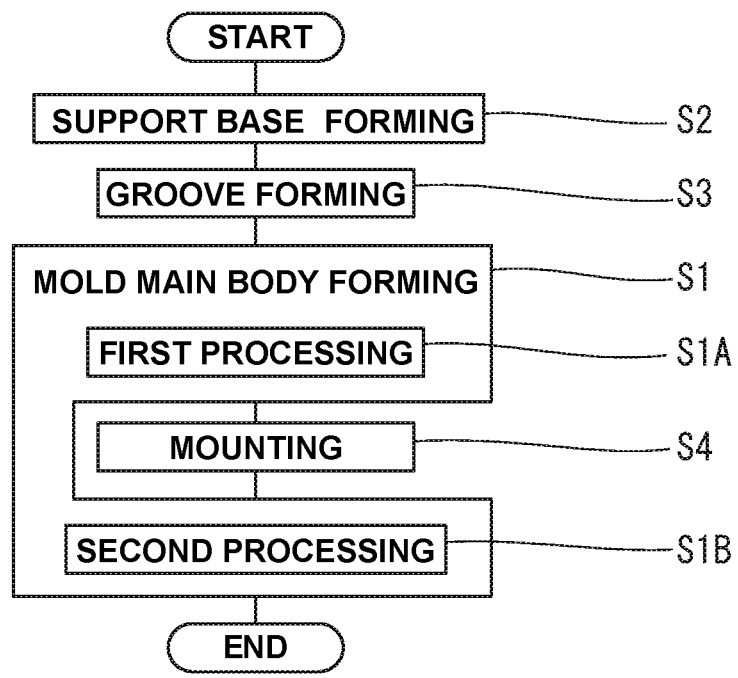
FIG. 8 is a flowchart for explaining a method of manufacturing a mold according to the first embodiment.

The order of performing mold main body forming step S1 and support base forming step S2 can be arbitrarily changed to increase the manufacturing efficiency. That is, as shown in FIG. 7, first processing step S1A of mold main body forming step S1 can be performed parallel to support base forming step S2. As shown in FIG. 8, support base forming step S2 can be performed prior to mold main body forming step S1. In addition, although not shown, first processing step S1A of mold main body forming step S1 may be performed prior to support base forming step S2.

In this embodiment, when performing second processing step S1B of mold main body forming step S1, second processing step S1B is performed after mounting step S4 (to be described later) in order to stabilize the support of the mold main body 12.

Figure 9A:
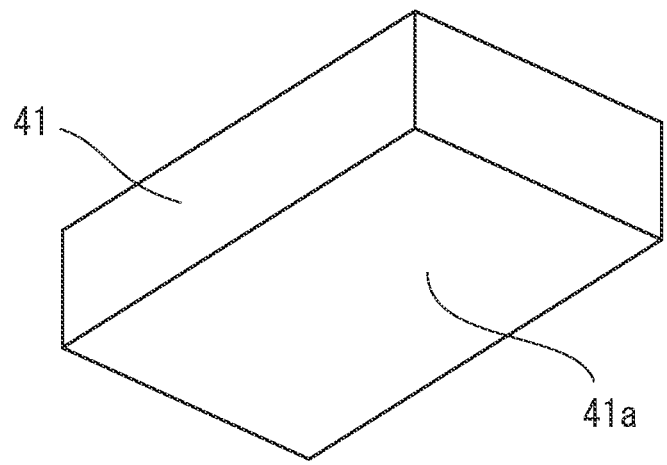
FIG. 9A is a perspective view for explaining a mold main body forming step.
Figure 9B:
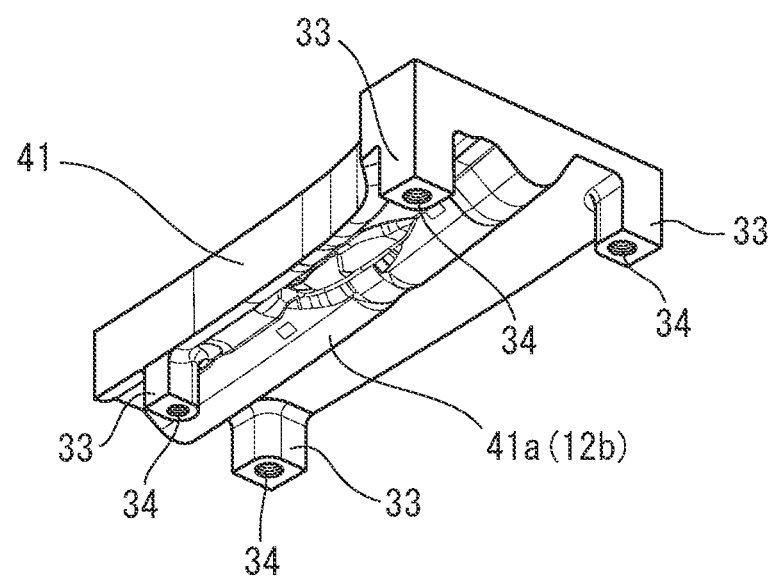
FIG. 9B is a perspective view for explaining the mold main body forming step.

In first processing step S1A of mold main body forming step S1, first, as shown in FIG. 9A, a columnar base member 41 serving as the mold main body 12 is prepared. Next, as shown in FIG. 9B, a lower surface 41a of the base member 41 is processed into a predetermined shape. The shape of the lower surface 41a is a shape that follows the molding face 12a of the mold main body 12 processed in second processing step S1B (to be described later). By completing the processing on the lower surface 41a of the base member 41, the back face 12b of the mold main body 12 is finished. In first processing step S1A, the columnar bodies 33 and the screw holes 34 with which the fixing bolts 28 are screwed into the columnar bodies 33 are formed.

Figure 10A:
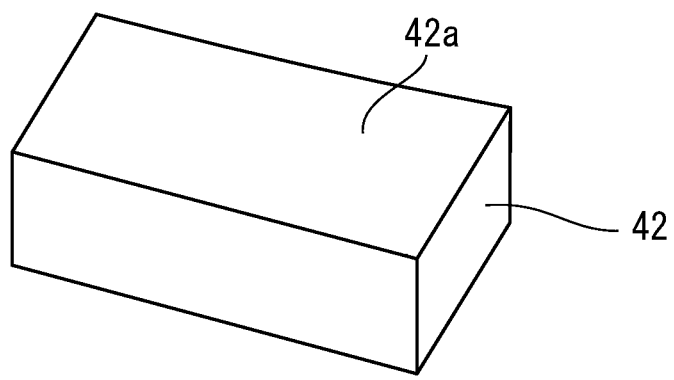
FIG. 10A is a perspective view for explaining a support base forming step.
Figure 10B:
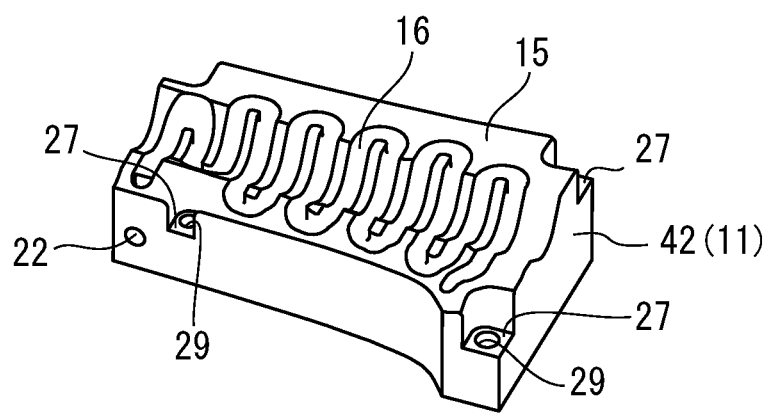
FIG. 10B is a perspective view for explaining the support base forming step.

In support base forming step S2, first, as shown in FIG. 10A, a columnar base member 42 serving as the support base 11 is prepared, and the first and second passage holes 21 and 22 are formed in the base member 42, although not shown. An upper surface 42a of the base member 42 is machined. As shown in FIG. 10B, the shape of the mounting surface 15 is formed to conform to the shape of the back face 12b of the mold main body 12. At the same time, the mounting seats 27 and the through holes 29 are formed. In this manner, during the formation of the mounting surface 15, groove forming step S3 is performed.

In groove forming step S3, the groove 16 is formed to be connected to the mounting surface 15.

The base member 41 of the mold main body 12 on which the back face 12b is formed and the support base 11 in which the mounting surface 15 and the groove 16 are formed are assembled in mounting step S4.

Figure 11A:
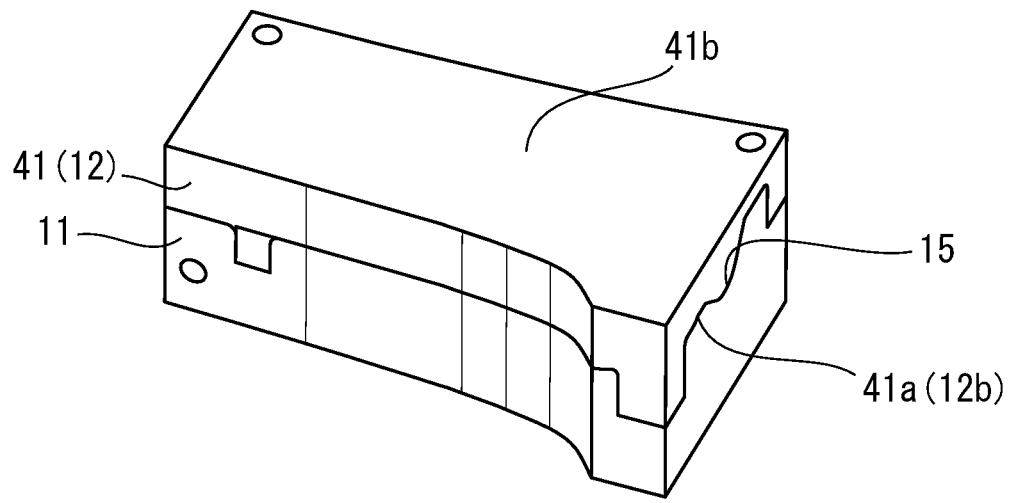
FIG. 11A is a perspective view for explaining a mold main body forming step.

As shown in FIG. 11A, in mounting step S4, the back face 12b of the mold main body 12 is overlapped on the mounting surface 15 of the support base 11, and the mold main body 12 is mounted on the support base 11 by the fixing bolts 28 (not shown).

By performing mounting step S4, the back face 12b of the mold main body 12 is brought into tight contact with the mounting surface 15 of the support base 11. For this reason, the opening portion of the groove 16 of the support base 11 is closed by the mold main body 12. As shown in FIGS. 4 and 5, a refrigerant passage 43 is formed by the groove 16 and part of the back face 12b of the mold main body 12.

Figure 11B:
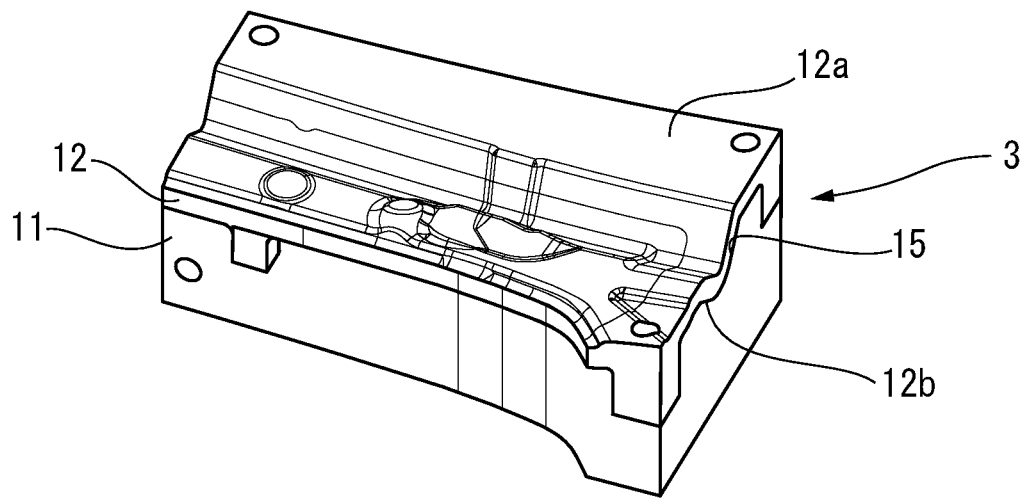
FIG. 11B is a perspective view for explaining the mold main body forming step.

After mounting step S4, second processing step S1B is performed. In second processing step S1B, as shown in FIG. 11A, machining is performed on the upper surface 41b of the base member 41 to form the molding face 12a in a state in which the base member 41 of the mold main body 12 overlaps the support base 11. Upon completion of this machining, the mold main body 12 including the molding face 12a is formed, as shown in FIG. 11B.

In the hot press mold thus manufactured, the refrigerant is supplied to one passage hole of the first passage hole 21 and the second passage hole 22 and discharged from the other passage hole. The refrigerant flows through the refrigerant passage 43 to cool the support base 11 and the mold main body 12. In this embodiment, since the mold main body 12 serves as the lid of the refrigerant passage 43 made of the groove 16, efficient cooling can be performed. Since the thickness of the mold main body 12 is formed to be constant, an interval between the molding face 12a and the refrigerant passage 43 can be kept substantially constant. There can be provided a hot press mold and a method of manufacturing the same in which the molded product (not shown) molded by the molding face 12a can be cooled substantially uniformly.

The mold main body 12 according to this embodiment can be mounted on the support base 11 by the fixing bolts 28. As compared with a case in which fixing of the mold main body 12 to the support base 11 is performed by, for example, soldering, the work can be easily performed, thereby quickly manufacturing the lower mold 3 and the upper mold 4.

Mold main body forming step S1 in this embodiment is formed by first processing step S1A of forming the lower surface 41a of the base member 41 serving as the mold main body 12 into a predetermined shape and second processing step S1B of forming the molding face 12a on the base member 41 in a state in which the base member 41 of the mold main body 12 is supported on the support base 11 formed in support base forming step S2. For this reason, the molding face 12a can be formed in a state in which the mold main body 12 is firmly supported by the support base 11. In addition, since the molding face 12a can be formed in a state in which the mold main body 12 is positioned to the final position with respect to the support base 11, the molding face 12a can be formed with high precision.

Second Embodiment

In the hot press mold according to the above embodiment, a seal can be provided in a mating portion between a mounting surface 15 of a support base 11 and a back face 12b of a mold main body 12. This sealing can be performed using a liquid gasket, a brazing material, or an O-ring. If sealing is performed using the liquid gasket, the liquid gasket is applied to the surface except a groove 16 of the mounting surface 15 and mounting seats 27.

When sealing is performed using a brazing material, sealing is performed on the surface except the groove 16 of the mounting surface 15 and the mounting seats 27.

Figure 12:
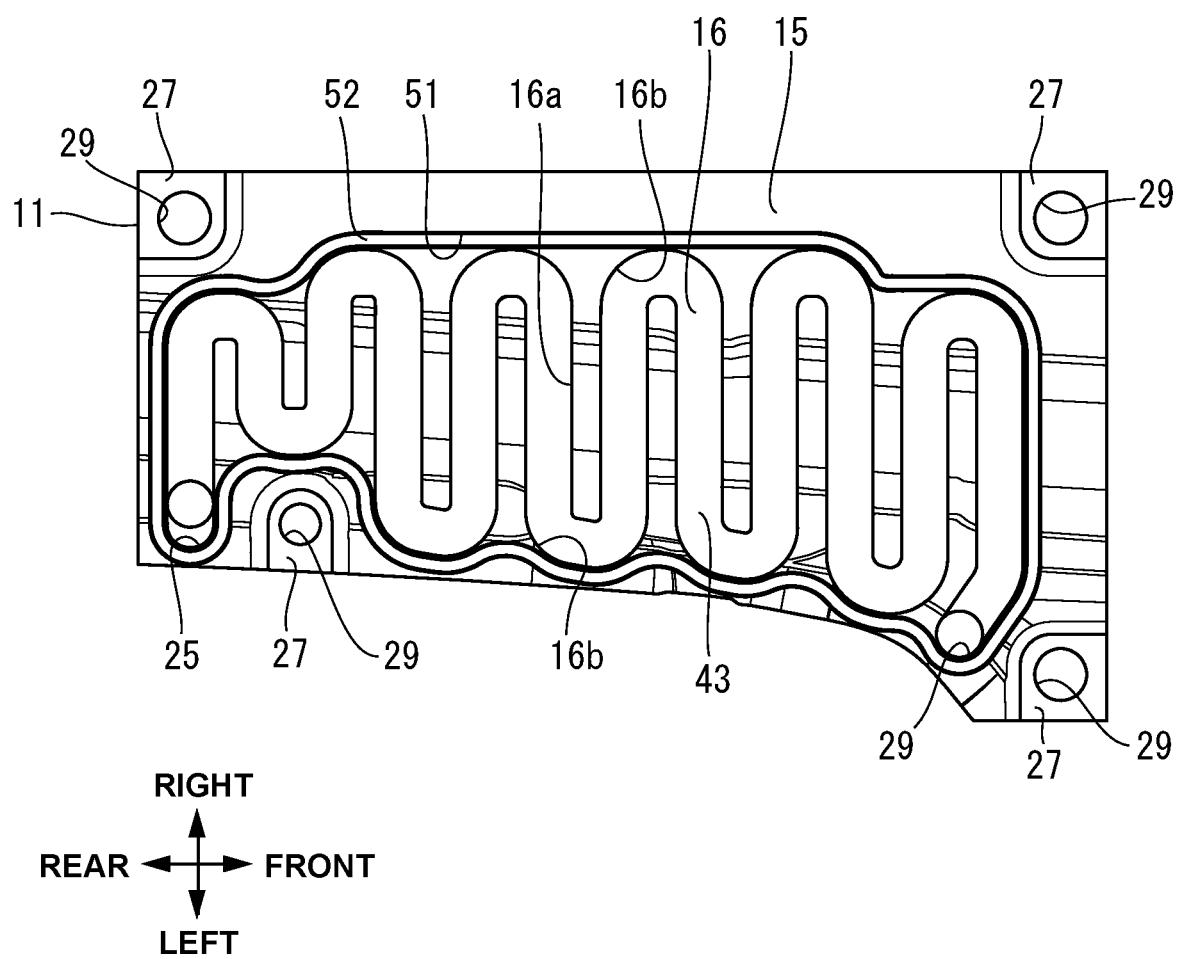
FIG. 12 is a plan view of a support base according to the second embodiment.
Figure 13:
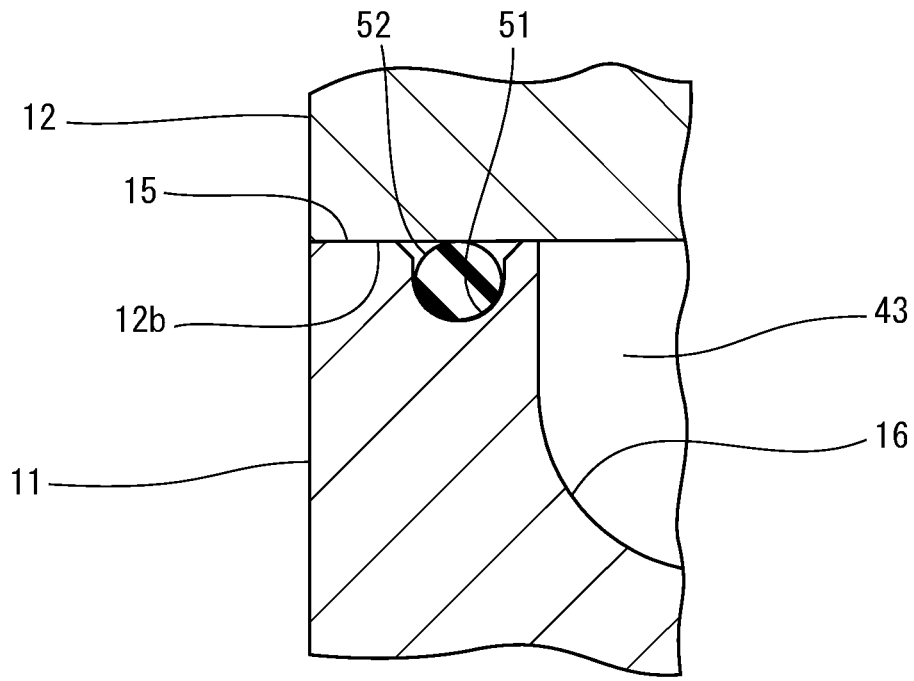
FIG. 13 is a sectional view in which part of a support base according to the second embodiment is enlarged.

When sealing is performed using an O-ring, sealing can be performed as shown in FIGS. 12 and 13. In FIGS. 12 and 13, the same reference numerals as in FIGS. 1 to 6 denote equivalent or the same parts, and a detailed description will be appropriately omitted. When sealing is performed using an O-ring, a sealing groove 51 is formed in the mounting surface 15 of the support base 11, and an O-ring 52 is mounted in the groove 51, as shown in FIG. 12.

The sealing groove 51 is formed to surround the formation range of the refrigerant groove 16 (surround a refrigerant passage 43). The O-ring 52 is arranged to be slightly elastically deformed while the O-ring 52 is clamped by the sealing groove 51 and the back face 12b of the mold main body 12 in a state in which the mold main body 12 is fixed on the support base 11 by fixing bolts 28.

As described above, when sealing is performed between the mounting surface 15 of the support base 11 and the back face 12b of the mold main body 12, the refrigerant can be prevented from leakage outside the mold through the passage between the mounting surface 15 of the support base 11 and the back face 12b of the mold main body 12.

Third Embodiment

Figure 14:
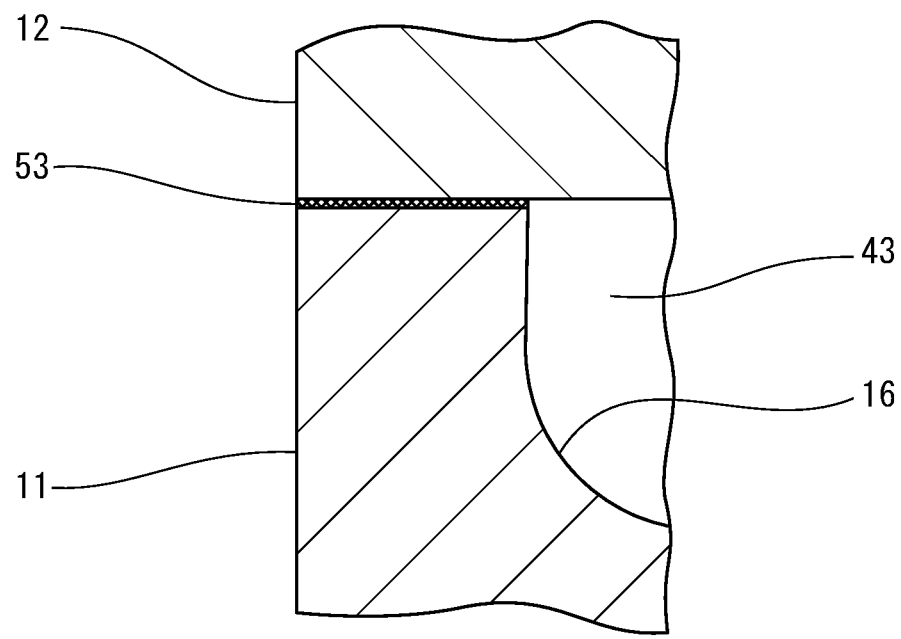
FIG. 14 is a sectional view in which part of a support base according to the third embodiment is enlarged.
Figure 15:
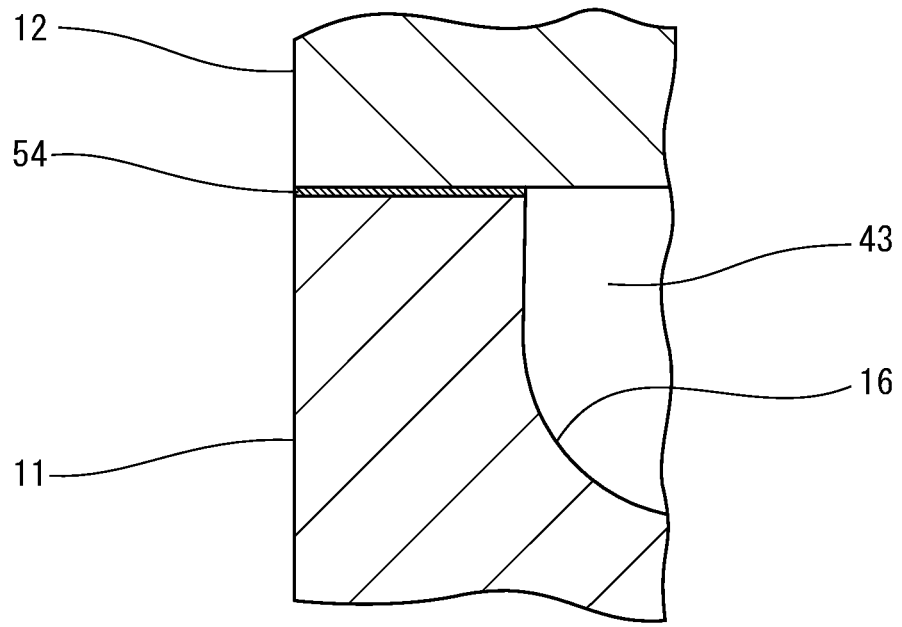
FIG. 15 is a sectional view in which part of a support base according to the third embodiment is enlarged.
Figure 16:
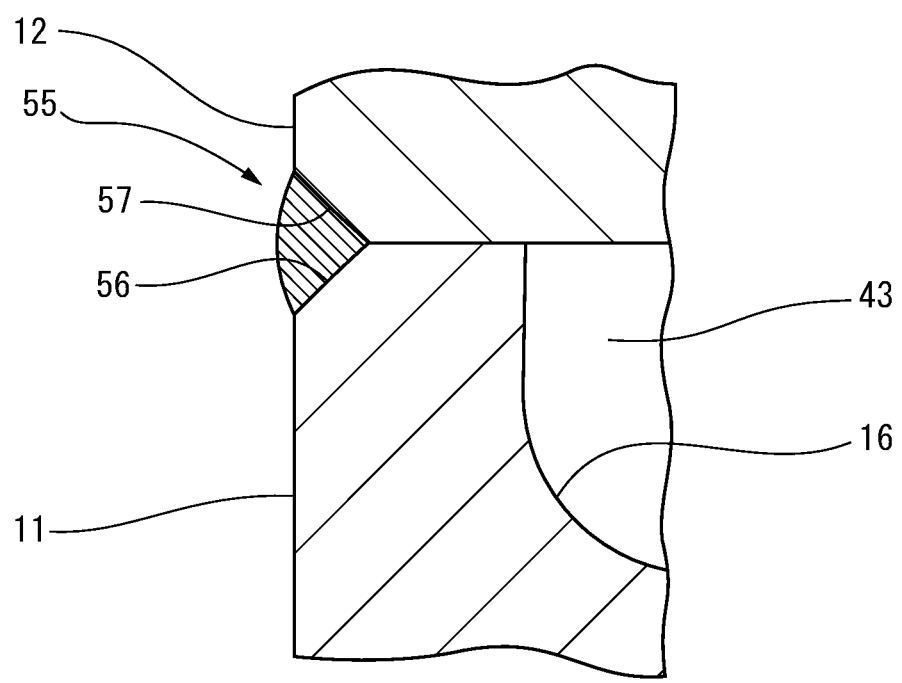
FIG. 16 is a sectional view in which part of the support base according to the third embodiment is enlarged.
Figure 17:
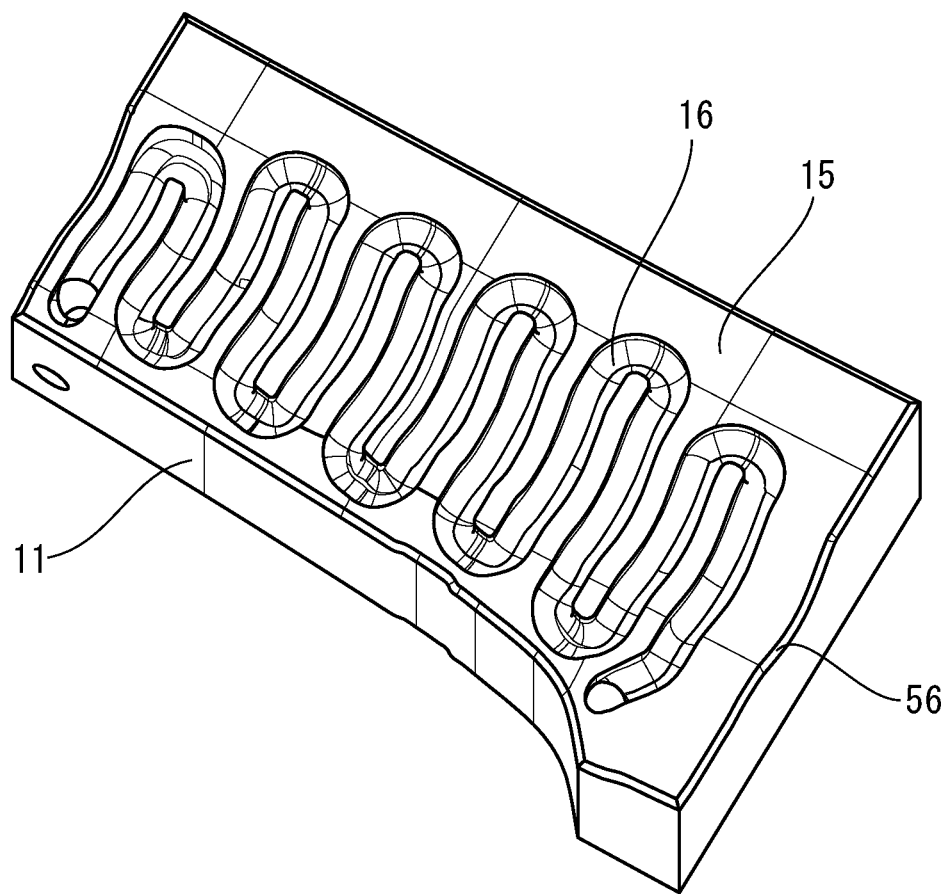
FIG. 17 is a perspective view of the support base according to the third embodiment.

When fixing a mold main body 12 to a support base 11, a form not using fixing bolts 28 can be employed. In order to fix the mold main body 12 to the support base 11 without using the fixing bolts 28, fixing can be performed using adhesion as shown in FIG. 14, brazing as shown in FIG. 15, or soldering as shown in FIGS. 16 and 17. In FIGS. 14 to 17, the same reference numerals as in FIGS. 1 to 6 denote equivalent or the same parts, and a detailed description thereof will be appropriately omitted.

When fixing the mold main body 12 to the support base 11 by adhesion, an adhesive 53 is sandwiched between the support base 11 and the mold main body 12, as shown in FIG. 14.

When fixing the mold main body 12 to the support base 11 by brazing, a brazing material 54 is sandwiched between the support base 11 and the mold main body 12, and the brazing material 54 is melted, as shown in FIG. 15. By performing adhesion or brazing as described above, the mold main body 12 can be fixed to the support base 11 by the adhesion portion or the brazing portion. In addition, the refrigerant can be prevented from leakage from the passage between a mounting surface 15 of the support base 11 and a back face 12b of the mold main body 12.

A soldering portion 55 shown in FIG. 16 is formed in a portion surrounding, from the outside, the entire range of the mating portion between the support base 11 and the mold main body 12. That is, soldering is performed such that the soldering portion 55 is not interrupted in the entire surrounding region of the mold main body 12. In order to perform soldering as described above, groove faces 56 and 57 are formed on the outer edge portion of the mounting surface 15 of the support base 11 and the outer edge portion of the back face 12b of the mold main body 12, and the soldering portion 55 is formed between the groove faces 56 and 57. As shown in FIG. 17, the groove face 56 is formed to surround the entire region of the support base 11. Although not shown, the groove face 57 is formed to surround the entire region of the mold main body 12 as in the groove face 56. This welding is performed by, for example, laser welding.

By fixing the mold main body 12 to the support base 11 by the adhesive 53 or fixing the mold main body 12 to the support base 11 by brazing or soldering, as compared with the case in which fixing bolts 28 are used, the number of machining operations for the support base 11 and the mold main body 12 can be reduced, thereby facilitating the manufacture of the mold.

Fourth Embodiment

Figure 18:
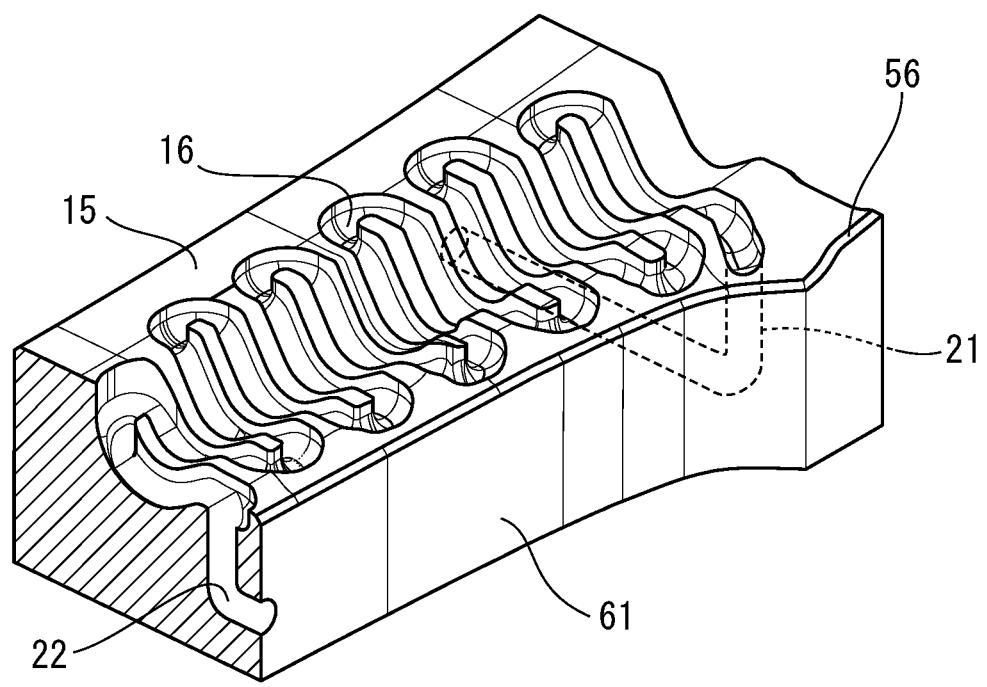
FIG. 18 is a perspective view of a support base according to the fourth embodiment.

To form a groove in a support base, the support base can be formed by an integral molded product, as shown in FIG. 18. In FIG. 18, the same reference numerals as in FIGS. 1 to 17 denote equivalent the same parts, and a detailed description thereof will be appropriately omitted. FIG. 18 draws that part of the support base is in a cutaway state.

A support base 61 shown in FIG. 18 is formed to have the same structure as in a support base 11 shown in FIG. 17 except the integral molded product. The support base 61 as the integral molded product can be formed by casting or a 3D printer. When the support base 61 is formed by casting, a groove 16 can be molded in the casing process using a core (not shown). When forming the support base 61 by casting, a first passage hole 21 and a second passage hole 22 can be formed by machining after casting or can be molded into a predetermined shape (see FIG. 18) by casting using a core (not shown). Note that a groove face 56 is formed in the outer edge portion of a mounting surface 15 in the support base 61 shown in FIG. 18, and a mold main body 12 (not shown) is fixed by soldering. However, the support base 61 as the integral molded product can also employ an arrangement for fixing the mold main body 12 by the fixing bolts 28 (not shown) as in a case in which the form of the first embodiment is employed.

As described above, when the support base 61 is made of the integral molded product, the mounting surface 15 can be formed to tightly contact a back face 12b of the mold main body 12 with high precision. When the back face 12b of the mold main body 12 is formed to have a shape that follows a molding face 12a, the mounting surface 15 of the support base 61 can follow the molding face 12a. Accordingly, variations in interval between the molding face 12a of the mold main body 12 and a refrigerant passage 43 can be further reduced, and the molding face 12a can be cooled so that the temperature in the entire region of the molding face 12a is kept constant.

In addition, since the first passage hole 21 and the second passage hole 22 can be formed in the process of forming other portions of the support base 61, the number of machining operations can be further reduced, and the manufacture of the support base 61 can be further facilitated.

Fifth Embodiment

Figure 19:
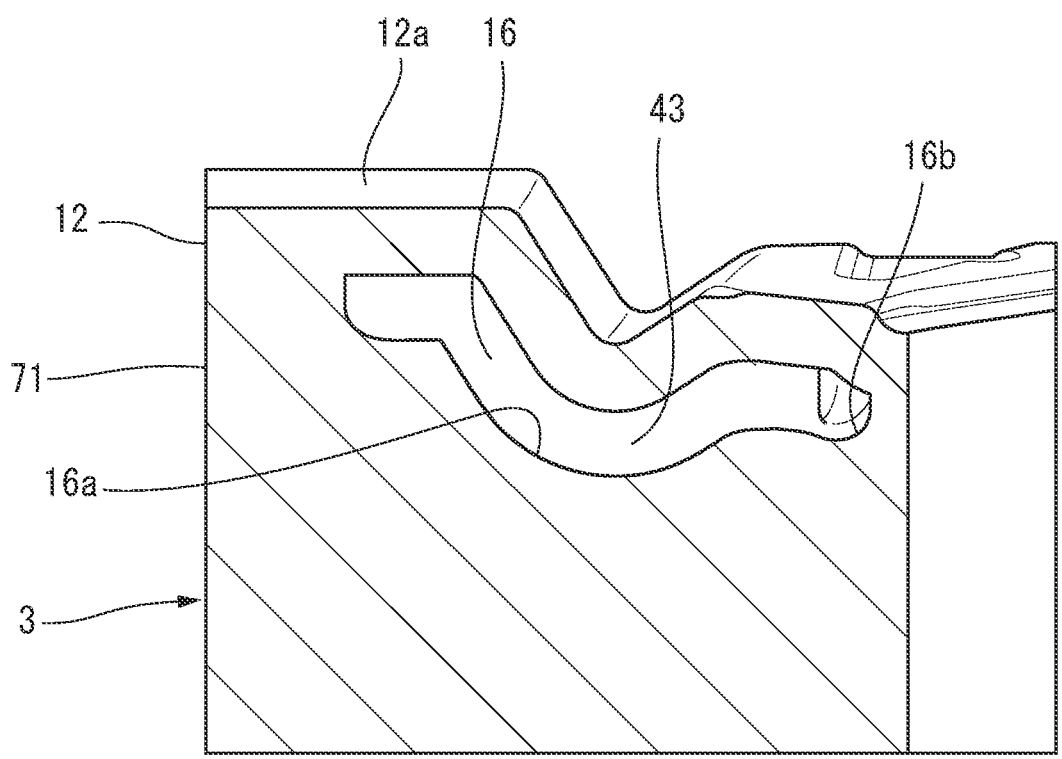
FIG. 19 is a sectional view in which a lower mold according to the fifth embodiment is viewed in the front-and-rear direction.

A mold according to the present invention can be formed, as shown in FIG. 19. In FIG. 19, the same reference numerals as in FIGS. 1 to 18 denote equivalent the same parts, and a detailed description thereof will be appropriately omitted. The mold and the method of manufacturing the same according to this embodiment are an embodiment of a mold described in claim 7 of the present invention and a method of manufacturing the same defined in claim 10 of the present invention.

A lower mold 3 shown in FIG. 19 includes a mold member 71, a molding face 12a formed on the surface of the mold member 71, and a refrigerant passage 43 formed inside the mold member 71 so as to extend in the molding face 12a apart from the molding surface 12a at a predetermined distance. The mold member 71 is formed such that the region including the entire range from the molding face 12a to the refrigerant passage 43 is made of a single material. The lower mold 3 is manufactured by forming the molding face 12a and a refrigerant passage 43 by a mold material that changes from a molten state to a solid state. More specifically, the lower mold 3 can be formed by casting or a 3D printer. When the lower mold 3 is formed by casting, the refrigerant passage 43 can be molded using a core (not shown).

As shown in this embodiment, when the lower mold 3 is entirely formed by an integral molded product, the number of machining operations can be further reduced, and the lower mold 3 can be formed more easily.

In the first to fourth embodiments, an example in which the groove 16 is formed in the support base 11 is shown. However, the present invention is not limited to this. That is, the groove 16 can be formed in the mold main body 12 or both the support base 11 and the mold main body 12. Even with this arrangement, the molded product can be cooled substantially uniformly.

In each embodiment described above, an example in which the present invention is applied to the hot press mold has been described. However, the present invention is also applicable to another type of mold such as an injection mold or a worm press mold.

EXPLANATION OF THE REFERENCE NUMERALS AND SIGNS

1 . . . hot press mold, 2 . . . metal plate member, 11, 61 . . . support base, 12 . . . mold main body, 12a . . . molding face, 12b . . . back face, 15 . . . mounting surface, 16 . . . groove, 28 . . . fixing bolt (bolt), 42 . . . base member, 43 . . . refrigerant passage, 52 . . . O-ring (sealing material), 55 . . . soldering portion, 71 . . . mold member, 51 . . . mold main body forming step, S2 . . . support base forming step, S1A . . . first processing step, S1B . . . second processing step, S3 . . . groove forming step, S4 . . . mounting step

The invention claimed is:

1. A mold comprising
a mold main body including a molding face, a back face located on an opposite side to the molding face, and a columnar body protruding from the back face, the mold main body formed with a substantially constant thickness except the columnar body,
a support base including a mounting surface which contacts the back face of the mold main body, and a recessed mounting seat, the support base to which the mold main body is fixed as the columnar body overlap the mounting seat, and
a refrigerant passage through which a refrigerant for cooling the molding face of the mold main body flows, wherein the refrigerant passage is composed of a groove formed in the mounting surface of the support base and the mold main body which covers the groove, the groove extending along the mounting surface avoiding the mounting seat to which the columnar body is mounted,
the groove includes a plurality of straight portions which extend linearly between a pair of side surfaces, and a plurality of bent portions each of which is bent and connected to the two ends of the corresponding straight portions,
the straight portions are aligned at an interval in a direction perpendicular to a direction along which the straight portions extend,
each of the bent portions connects a couple of the straight portions which are adjacent to each other such that the refrigerant flows through the plurality of straight portions,
the plurality of straight portions and the plurality of bent portions form a single refrigerant passage from an inlet side to an outlet side,
the columnar body is formed in the mold main body to form a part of the mold main body,
a tip surface of the columnar body is flat,
the mounting seat is formed at a position lower than the mounting surface and used to fix the mold main body on the support base, and is formed flat so as to be in close contact with the tip surface of the columnar body in a state where the mold main body is attached to the support base, and
a space between the mounting surface of the support base and the mounting seat is formed in a shape in which the columnar body fits.

2. The mold according to claim 1, wherein the columnar body includes a screw hole with which a fixing bolt threadably engaged.

3. The mold according to claim 1, wherein
an entire region surrounding the refrigerant passage, except the columnar body and the mounting seat, is sealed by an O-ring provided between the mold main body and the support.

4. The mold according to claim 1, wherein
the back face of the mold main body is formed in a shape that follows the molding face, and
the support base is an integral molded product.

5. The mold according to claim 1, wherein
the columnar body and the mounting seat are provided at each of four corners of the mold.

6. The mold according to claim 1, wherein
the mounting seat is surrounded by the straight portions and the bent portions of the groove.

7. The mold according to claim 1, wherein
one end of the groove is connected to a first passage hole formed in an end portion of the support base,
the other end of the groove is connected to a second passage hole formed in another end portion of the support base, wherein
the first passage hole and the second passage hole are connected to a refrigerant supply device, which is configured to supply a liquid refrigerant to one of the first passage hole and the second passage hole and discharge the refrigerant from the other communication hole.

8. The mold according to claim 1, wherein
the groove is formed to have a U-shape cross sectional profile.

9. The mold according to claim 1, wherein
the mold main body is made of hot press mold steel, and the support base is made of mechanical structure carbon steel.

* * * * *